Patented May 14, 1929.

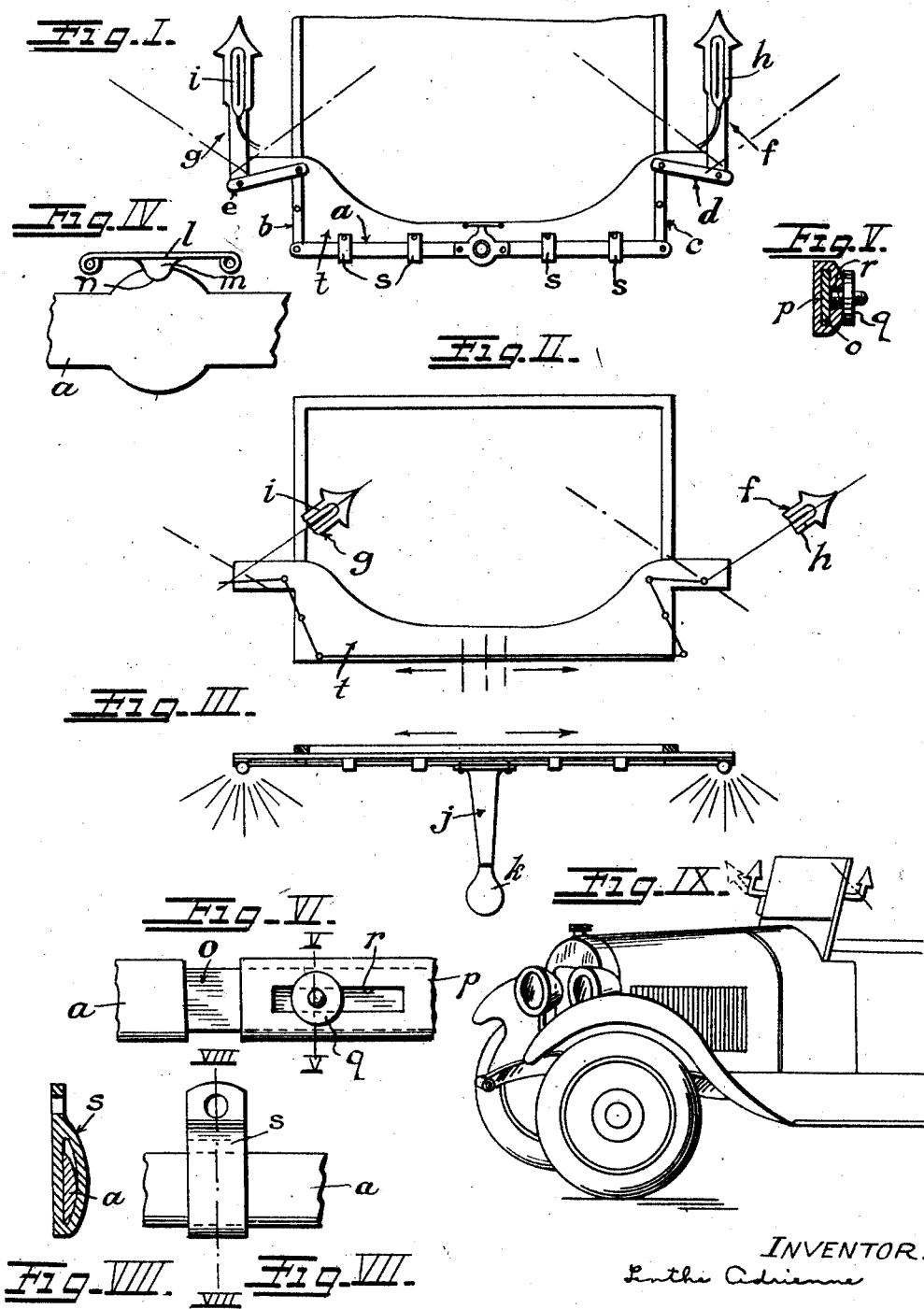

1,712,486

UNITED STATES PATENT OFFICE.

LENTHE ADRIENNE, OF SAO PAULO, BRAZIL.

DEVICE FOR INDICATING THE DIRECTION OF TRAVEL OF AUTOMOBILES.

Application filed March 2, 1928. Serial No. 258,519.

The present invention, shown in the accompanying drawings, refers to a device for indicating the direction of travel of automobiles and comprises a mechanism of hinged rods, placed adjacent the frame of the wind shield or the cowl and which, through easy manipulation from the motorist's seat, indicates the direction the car is going to take.

Said mechanism includes a horizontal bar $a$; crank levers $b$—$c$; connecting links $d$—$e$; signaling arms $f$—$g$, the latter being arranged as crank levers and in the form of arrows supporting an electric lamp, which is turned on and off through contacts suitably controlled by the operation of the mechanism and not shown on the drawings.

Fig. I is a front view of the device constructed in accordance with the invention and attached to the wind shield of a vehicle, Fig. II is a diagrammatic representation showing the movement of the members comprising the device of Fig. I, Fig. III is a plan view of the device constructed in accordance with the invention, Fig. IV is a detail view showing trigger mechanism for retaining the device in neutral position, Fig. V is a cross sectional view on the line V—V of Fig. VI, Fig. VI is a detail view of one of the members of the device, Fig. VII is a detail view of a member of the device, Fig. VIII is a cross sectional view on the line of VIII—VIII of Fig. VII, Fig. IX is a general view illustrating the application of the device to the wind shield of a vehicle.

In the middle of bar $a$ is provided an operating handle $j$, which may at the same time serve as horn $k$. Moving the handle to the left the arrows $f$—$g$ will move to that side, arrow $f$ becoming visible and arrow $g$ remaining hidden; and conversely, if the maniple be moved to the right by the motorist. In the first case the car is going to the left and in the second to the right. In Fig. I is shown the neutral position, with the arrows $f$—$g$ in vertical position. This position is assured by the spring trigger $l$, Fig. IV, the tooth $m$ of which is lodged in the depression $n$ of bar $a$, which may be enlarged at the middle as shown. All the bars, arms and levers may be extended, as shown in Figs. V and VI, to adapt the device to the various sizes of automobiles. The tongue $o$ slides in a guide $p$ and is retained in it by a screw $q$, which works in a slot $r$. Figs. VII and VIII indicate the way to guide the bar $a$, with the clearance needed by the small play it must have. Bar $a$ is guided by means of handles $s$ provided in a convenient number. The whole is mounted in a plate $t$, of suitable form and dimensions, according to the types and sizes of automobiles.

I claim:

1. A manually operable device for indicating the direction of motor vehicles, comprising a supporting member adapted to be secured to the body of the vehicle adjacent to the driver's seat, a horizontal laterally slidable bar mounted on said member, said bar having a depression therein, pivoted crank arms mounted on said member, one connected to each end of said bar, a pivoted indicator mounted on said member adjacent to each crank arm, links connecting said crank arms and said indicators, a spring adapted to engage in the depression in said bar to normally hold said indicators in neutral position, and an operating handle secured to said bar and adapted to move it laterally in either direction to selectively actuate said indicators.

2. A manually operable device for indicating the direction of vehicles, comprising a supporting member adapted to be secured to the body of the vehicle adjacent the driver's seat, a horizontal laterally slidable bar mounted on said member, pivoted crank arms mounted on said member, one connected to each end of said bar, a pivoted indicator mounted on said member adjacent each crank arm, links connecting said crank arms and said indicators, said laterally slidable bar, crank arms and links being adjustably extensible, whereby said device may be adapted to vehicle bodies of different sizes, and an operating handle secured to said bar and adapted to move it laterally in either direction to selectively actuate said indicators.

In testimony whereof I affix my signature.

LENTHE ADRIENNE.